United States Patent [19]

Sasakura

[11] Patent Number: 5,166,803
[45] Date of Patent: Nov. 24, 1992

[54] IMAGE SIGNAL RECORDING AND REPRODUCING SYSTEM

[75] Inventor: Takao Sasakura, Kanagawa, Japan

[73] Assignee: Canon Kabushiki Kaisha, Tokyo, Japan

[21] Appl. No.: 811,885

[22] Filed: Dec. 19, 1991

Related U.S. Application Data

[63] Continuation of Ser. No. 507,362, Apr. 9, 1990, abandoned.

[30] Foreign Application Priority Data

Apr. 24, 1989 [JP] Japan .................................. 1-104217

[51] Int. Cl.⁵ .......................... H04N 9/89; H04N 9/79
[52] U.S. Cl. .................................... 358/323; 358/310; 358/320; 358/330
[58] Field of Search ............... 358/323, 320, 310, 330, 358/12, 14; 360/27; 369/83

[56] References Cited

U.S. PATENT DOCUMENTS

| | | | |
|---|---|---|---|
| 4,084,176 | 4/1978 | Trost | 358/340 |
| 4,528,599 | 7/1985 | Okano | 358/310 |
| 4,630,131 | 12/1986 | Ichinoi et al. | 358/323 |
| 4,656,527 | 4/1987 | Uchimi | 358/320 |
| 4,677,497 | 6/1987 | Yoshinaka | 358/310 |
| 4,812,920 | 3/1989 | Nagashima et al. | 358/330 |
| 4,851,928 | 7/1989 | Numakura et al. | 358/310 |
| 4,858,025 | 8/1989 | Tabei | 358/322 |
| 4,873,583 | 10/1989 | Kobayashi et al. | 358/310 |
| 4,941,054 | 7/1990 | Muramoto | 358/310 |

Primary Examiner—John W. Shepperd
Assistant Examiner—Tan Nguyen
Attorney, Agent, or Firm—Robin, Blecker, Daley & Driscoll

[57] ABSTRACT

This system is arranged to selectively subject a color or monochrome image signal to the recording signal processing for recording on the recording medium, selectively multiplex a first pilot signal with the color image signal subjected to the recording signal processing or a second pilot signal different from the first pilot signal with the monochrome image signal subjected to the recording signal processing, record the thus-multiplexed signal on the recording medium, detect the pilot signal multiplexed with the signal recorded on the recording medium, discriminate whether the detected pilot signal is the first pilot signal or the second pilot signal, and separate the pilot signal multiplexed with the signal reproduced from the recording medium in accordance with the discrimination result, and correct the time-base variation of the signal reproduced from the recording medium by using the thus-separated pilot signal. In this arrangement, during recording, the pilot signal and the monochrome image signal can be multiplexed without the risk of influencing the image quality conveyed by the monochrome image signal, and the multiplexed signal is recorded on the recording medium. During reproduction, the pilot signal is used to correct the time-base variation of the signal reproduced from the recording medium.

18 Claims, 5 Drawing Sheets

FIG.3(a) INPUT SAMPLED-VALUE SIGNAL

FIG.3(b) OUTPUT SIGNAL OF TRANSMISSION PATH 20

FIG.3(c) RE-SAMPLING PULSE

FIG.3(d) OUTPUT SIGNAL OF SWITCH 22 (RE-SAMPLE OUTPUT)

FIG.3(e) RE-SAMPLING PULSE OUT OF PHASE

FIG.3(f) OUTPUT OF SWITCH 22 UPON RE-SAMPLING OF FIG.3(e)

IMAGE SIGNAL RECORDING AND REPRODUCING SYSTEM

This is a continuation application under 37 CFR 1.62 of prior application Ser. No. 507,362, filed Apr. 9, 1990 now abandoned.

BACKGROUND OF THE INVENTION

1. Field of the Invention

The present invention relates to an image signal recording and reproducing system for recording an image signal on a recording medium and for reproducing the image signal recorded on the recording medium.

2. Description of the Related Art

It is known that various television systems such as NTSC systems and PAL systems have conventionally been used in still image signal recording/reproducing systems of the type which are arranged to record a still image signal on a recording medium and to reproduce a still image signal recorded on the recording medium. In general, the still image signal recording/reproducing systems utilize a method including the steps of frequency-modulating image signals of a format according to such a television system and magnetically recording the modulated image signals on small magnetic disks called video floppy disks. The resolution represented by the image signal recorded by the above method is substantially equal to that realized by the current television systems. However, if an image reproduced by such a still image recording/reproducing system is printed out by means of a printer or the like, image quality, particularly resolution, is low as compared to the resolution of a typical silver salt photograph.

In recent years, new television systems, such as a high-definition television (HDTV) system, have been investigated and proposed. The HDTV system realizes the vertical resolution of approximately 1,000 scanning lines per picture and has a signal band which provides horizontal resolution corresponding to the vertical resolution. For this reason, as a still image signal recording/reproducing system corresponding to the HDTV system, it is desired to provide a system capable of recording and reproducing still image signals which assure image quality of the order of 1,000×1,000 pixels.

In such circumstances, a recording/reproduction method which makes it possible to record still image signals with image quality as high as 1,000×1,000 pixels while retaining compatibility with the recording format used in a conventional type of still image signal recording/reproducing system, has previously been proposed in U.S. patent application Ser. No. 334,305 filed on Apr. 27, 1989, Ser. No. 344,202 filed on Apr. 27, 1989, Ser. No. 345,411 filed on Apr. 28, 1989, Ser. No. 450,393 filed on Dec. 14, 1989, Ser. No. 457,275 filed on Dec. 27, 1989, Ser. No. 460,308 filed on Jan. 3, 1990 now U.S. Pat. No. 5,075,802 and Ser. No. 460,306 filed on Jan. 3, 1990. The above method and the conventional method will be hereinafter referred to as a "CHSV (Compatible High-Definition Still Video) method" and a "SV method", respectively.

The operation of recording a luminance signal according to the CHSV method will be explained below. FIG. 1 partly shows the sampling positions of each luminance signal Y on a picture, which luminance signals Y are recorded on a video floppy disk by the CHSV method. The luminance signals Y (or Y signals) are sub-sampled and recorded in such a manner that each line of sample points is alternately offset in relation to the next adjacent line of sample points. For reproduction, the alternating sample points are converted into a lattice-like matrix of sample points by means of interpolation. The number of sample points is 600 (=1,200/2) per line and 500 (=1,000/2) per column, and information representing all the sample points in one picture is recorded on a total of four tracks. Referring to FIG. 1, for example, information representing the sample points contained in each line $A_1, A_2, \ldots$ is recorded on one particular track of the video floppy disk, information representing the sample points contained in each line $B_1, B_2, \ldots$ is recorded on another track of the video floppy disk, and so on. Recording on each track is performed in accordance with the recording format of the SV method, and the basebands of the Y signal and a chrominance signal C (or C signal) are approximately 7 MHz and approximately 1 MHz, respectively.

The following is an explanation of the analog transmission of sampled values which is performed in the CHSV method. FIG. 2 is a block diagram showing a conceptual arrangement for effecting such analog transmission. As shown in FIG. 2, an input analog image signal is sampled with a sampling period T and supplied to a transmission path 20, where it is subjected to the following processing. The sampled signal is first band-limited by a low-pass filter (LPF) 10, frequency-modulated by a frequency modulation circuit 12, and then recorded on a magnetic disk 14. The signal reproduced from the magnetic disk 14 is frequency-demodulated by a frequency demodulation circuit 16. The output of the frequency demodulation circuit 16 is band-limited by the low-pass filter (LPF) 18, which in turn outputs the result. As described above, the circuits 10–18 constitute the transmission path 20 having LPF characteristics. Then, a switch 22 re-samples the output of the LPF 18 and provides a sampled output. In the above-described method for analog transmission of sampled values, the re-sampling performed by the switch 22 plays an important role for restoring the original signal.

For example, if the signal input to the transmission path 20 of FIG. 2 is the sampled-value signal shown in FIGS. 3(a), the transmission path 20 provides an output waveform such as that shown in FIG. 3(b) in accordance with the LPF characteristics of the transmission path 20. If the period and phase of re-sampling pulses for controlling the re-sampling operation of the switch 22 (refer to FIG. 3(c)) completely coincide with the period T and phase of the input signal, the original input sampled-value signal will be able to be restored as shown in FIG. 3(d). However if the re-sampling pulses are out of phase as shown in FIG. 3(e), the waveform appearing on the output side of the switch 22 will be as shown in FIG. 3(f), and no sampled-value signal is correctly restored, thereby causing ringing. If the sampling periods differ from each other, correct restoration is similarly impossible.

Accordingly, when an image signal is to be recorded and reproduced on the basis of the CHSV method, it is necessary that re-sampling for reproduction be performed using a re-sampling pulse of correct frequency (period) and correct phase. In order to effect complete transmission (recording/reproduction) of the sampled-value signal, it is necessary that the transmission path 20 have linear phase characteristics (a flat group delay) and that its amplitude have a symmetrical roll-off characteristic centered at a frequency $f_s$ (½ T).

In order to accurately re-sample recorded sample points on the reproducing side, it is necessary that time-base variations which may occur during recording or reproduction be corrected accurately. For this reason, on the recording side, a sine-wave signal (reference signal) of frequency 2.5 MHz is frequency-multiplexed with the signal band defined between a color-difference frequency-modulated signal band and a luminance frequency-modulated signal band, and the frequency-multiplexed signal is recorded on a recording medium. On the reproducing side, a PLL circuit generates a clock signal having the same time-base variation component as the reproduced reference signal, and the reproduced image signal is written into an image memory in accordance with the clock signal serving as an image-memory write clock signal. The image signal stored in the image memory is read out in accordance with an accurate read clock, whereby time-base correction is effected.

However, the above-described method has a number of problems. For example, as shown in FIG. 4, the reference signal for correction of the time base is multiplexed with the frequency band between the color-difference frequency-modulated signal band and the luminance frequency-modulated signal band. As illustrated, the reference signal is adjacent to both the luminance frequency-modulated signal band and the color-difference frequency-modulated signal band. Accordingly, the reference signal leaks into the restored luminance signal or color-difference signal to exert an adverse influence, such as moiré, on the image signal, thereby deteriorating the image quality. Moreover, the problem of the leakage of a reference signal into a restored luminance signal is also experienced with black-and-white image signals, since the black-and-white image signals and color image signals follow the same recording and reproducing processes.

SUMMARY OF THE INVENTION

It is therefore an object of the present invention to provide an image signal recording and reproducing system capable of solving the above-described problems.

It is another object of the present invention to provide an image signal recording method capable of recording a monochrome image signal on a recording medium with high quality without deteriorating the image quality conveyed by the monochrome image signal.

To achieve the object, in accordance with one aspect of the present invention, there is provided an image signal recording method of recording an image signal on a recording medium, which includes the steps of: (A) subjecting a color image signal or a monochrome image signal to a recording signal processing for recording on the recording medium; (B) multiplexing a first pilot signal with the color image signal subjected to the recording signal processing in Step (A), or a second pilot signal with the monochrome image signal subjected to the recording signal processing in Step (A); and (C) recording, on the recording medium, the color image signal subjected to the recording signal processing in Step (A) and multiplexed with the first pilot signal in Step (B), or the monochrome image signal subjected to the recording signal processing in Step (A) and multiplexed with the second pilot signal in Step (B).

It is another object of the present invention to provide an image signal recording apparatus capable of recording a monochrome image signal on a recording medium with high quality without deteriorating the image quality conveyed by the monochrome image signal.

To achieve the above object, in accordance with another aspect of the present invention, there is provided an image signal recording apparatus for recording an image signal on a recording medium. The apparatus includes: recording signal processing means for receiving a color image signal or a monochrome image signal and subjecting the color image signal or the monochrome image signal to a recording signal processing for recording on the recording medium; pilot signal multiplexing means for multiplexing a first pilot signal with the color image signal subjected to the recording signal processing by the recording signal processing means, or a second pilot signal different from the first pilot signal with the monochrome image signal subjected to the recording signal processing by the recording signal processing means; and recording means for recording, on the recording medium, the color image signal subjected to the recording signal processing by the recording signal processing means and multiplexed with the first pilot signal by the pilot signal multiplexing means, or the monochrome image signal subjected to the recording signal processing by the recording signal processing means and multiplexed with the second pilot signal by the pilot signal multiplexing means.

It is another object of the present invention to provide an image signal recording and reproducing system capable of recording and reproducing a monochrome image signal with high quality on a recording medium without the risk of deteriorating the image quality conveyed by the monochrome image signal.

To achieve the above object, in accordance with another aspect of the present invention, there is provided an image signal recording and reproducing system for recording an image signal on a recording medium and for reproducing the image signal recorded on the recording medium. The system is provided with a recording apparatus and a reproducing apparatus. The recording apparatus includes: recording signal processing means for receiving a color image signal or a monochrome image signal and subjecting the color image signal or the monochrome image signal to a recording signal processing for recording on the recording medium; pilot signal multiplexing means for multiplexing a first pilot signal with the color image signal subjected to the recording signal processing by the recording signal processing means, or a second pilot signal different from the first pilot signal with the monochrome image signal subjected to the recording signal processing by the recording signal processing means; and recording means for recording, on the recording medium, the color image signal subjected to the recording signal processing by the recording signal processing means and multiplexed with the first pilot signal by the pilot signal multiplexing means, or the monochrome image signal subjected to the recording signal processing by the recording signal processing means and multiplexed with the second pilot signal by the pilot signal multiplexing means. The reproducing apparatus includes: reproducing means for reproducing a signal recorded on the recording medium; discrimination means arranged to detect the pilot signal multiplexed with the signal reproduced by the reproducing means and discriminate whether the detected pilot signal is the first pilot signal or the second pilot signal; and time-base variation correcting means arranged to separate the pilot signal multiplexed with the signal reproduced by the reproducing means in accordance with the result of discrimination made by the discrimination means, and correct the time-base variation of the signal reproduced by the reproducing means, by using the separated pilot signal.

It is another object of the present invention to provide an image signal recording medium on and from which a monochrome image signal can be recorded and reproduced with high quality without the risk of deteriorating the image quality conveyed by the monochrome image signal.

To achieve the above object, in accordance with another aspect of the present invention, there is provided an image signal recording medium for recording thereon a color image signal or a monochrome image signal. The color image signal recorded on the image signal recording medium is multiplexed with a first pilot signal, and the monochrome image signal is multiplexed with a second pilot signal different from the first pilot signal.

Further objects, features and advantages of the present invention will become apparent from the following detailed description of an embodiment of the present invention with reference to the accompanying drawings.

DETAILED DESCRIPTION OF THE PREFERRED EMBODIMENT

A preferred embodiment of the present invention will be described in detail below with reference to the accompanying drawings.

Figure 1:
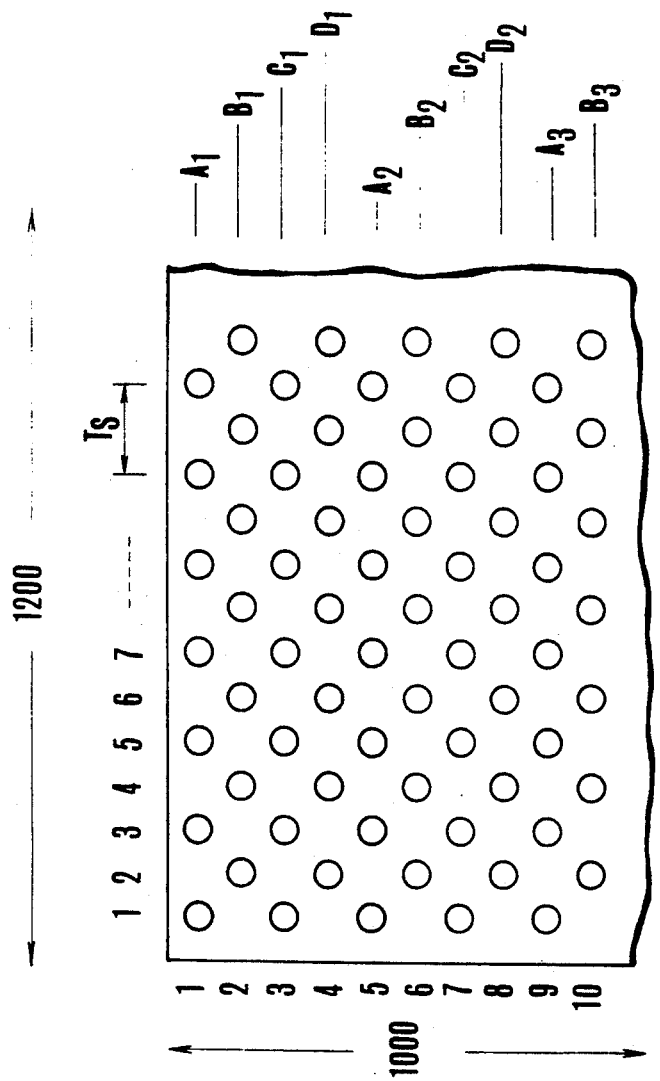
FIG. 1 is a partial schematic view showing the sampling positions of each luminance signal Y on a picture, which luminance signals Y are recorded on a video floppy disk by a CHSV method.
Figure 2:
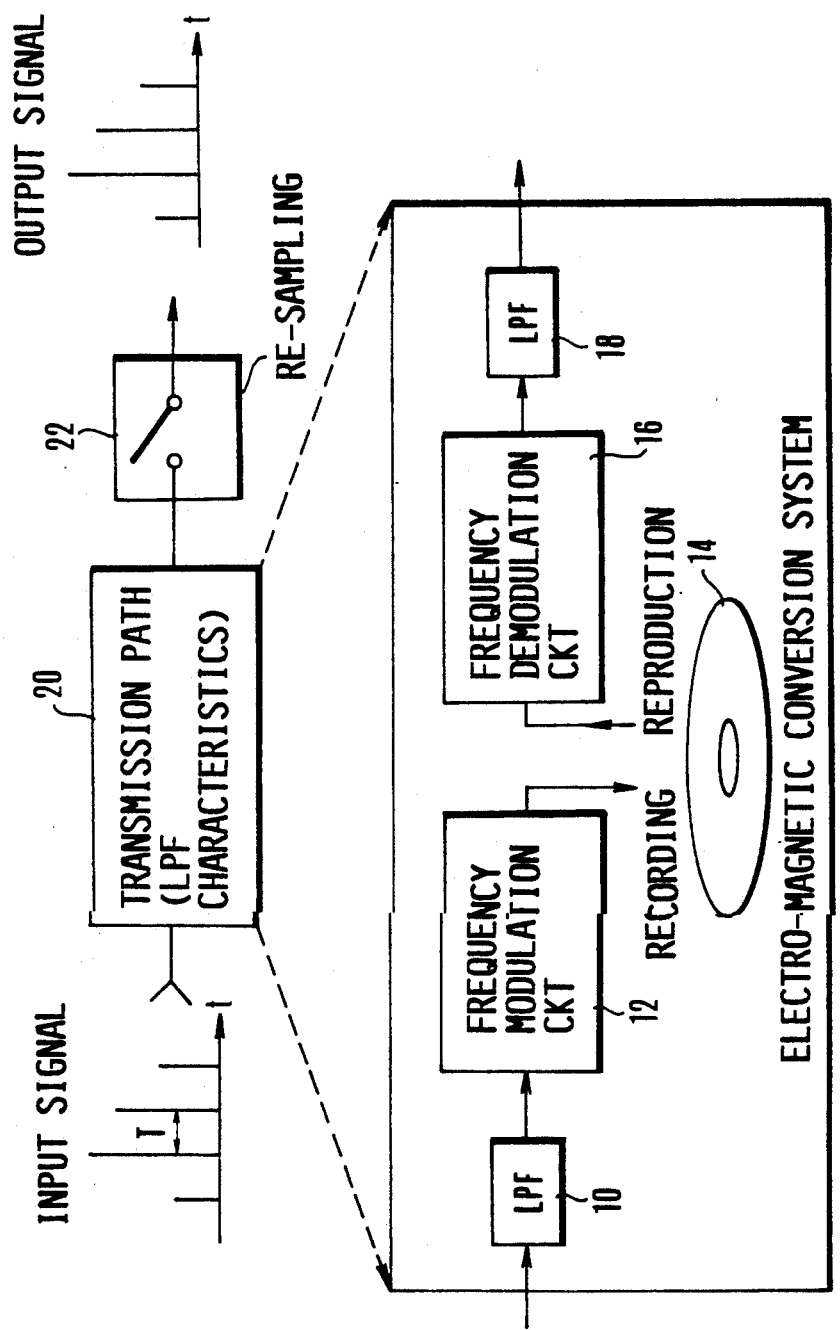
FIG. 2 is a block diagram showing the concept of analog transmission of sampled values.
Figure 3:
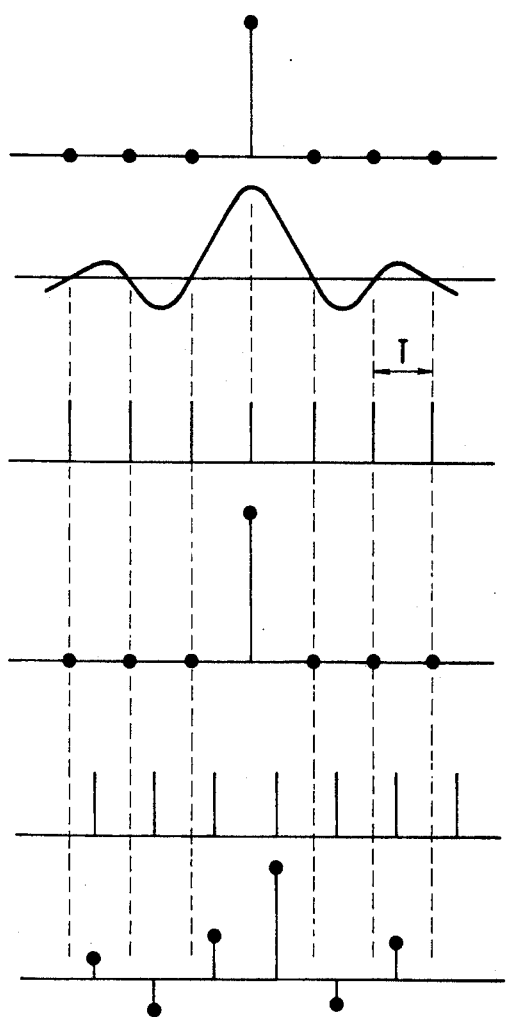
FIGS. 3(a) to 3(f) are signal waveform diagrams which serve to illustrate the analog transmission of sampled values.
Figure 4:
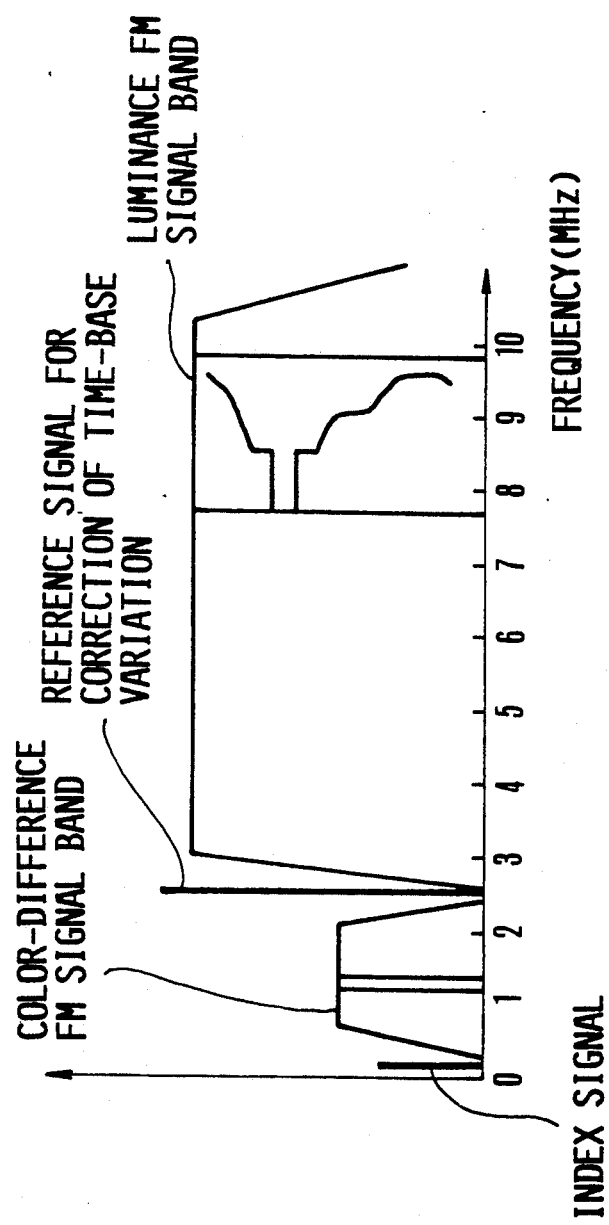
FIG. 4 is a waveform diagram showing the frequency allocation of a color image signal recorded on a video floppy disk.
Figure 5:
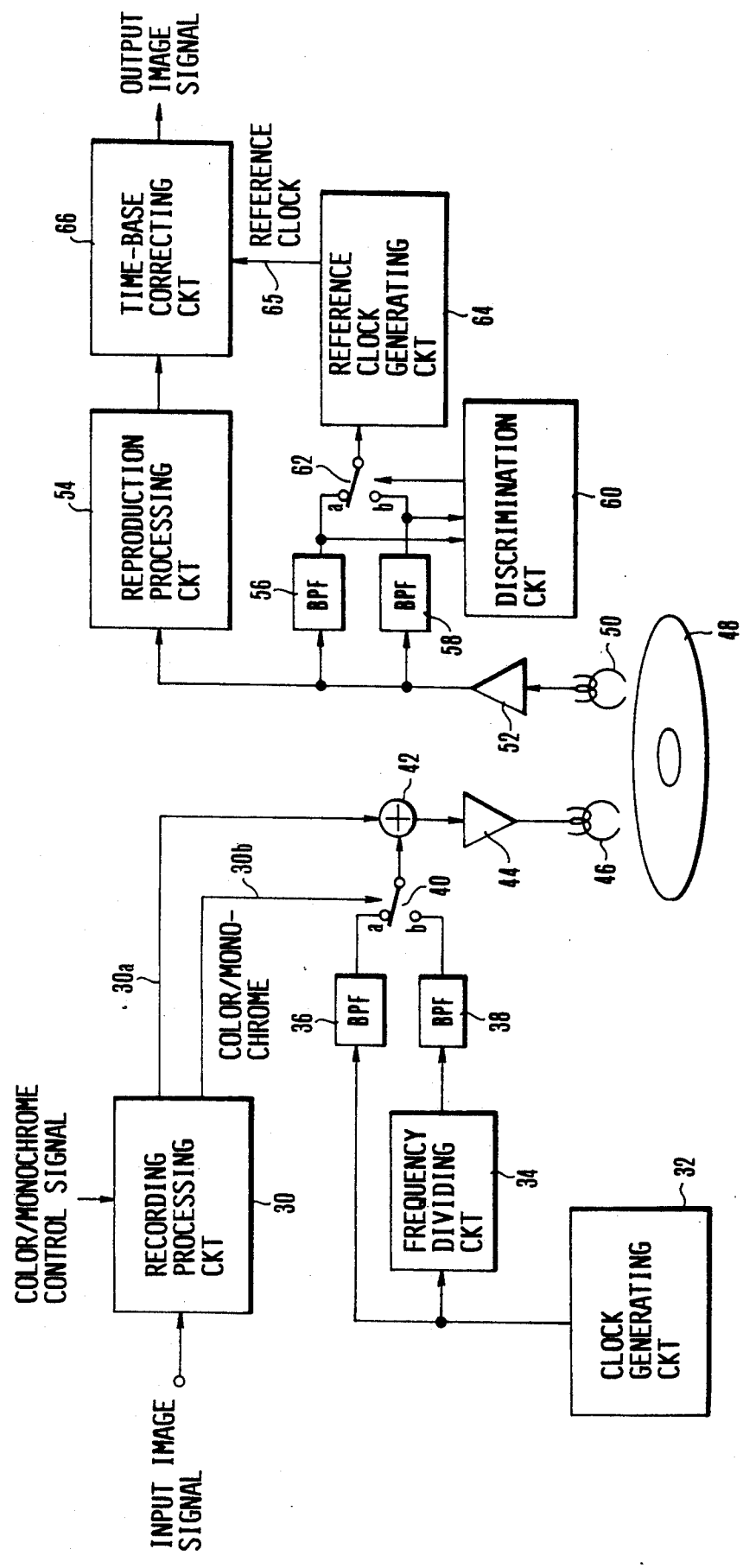
FIG. 5 is a block diagram showing the layout of an image signal recording and reproducing apparatus according to one embodiment of the present invention.

FIG. 5 is a block diagram showing the embodiment of the present invention. A recording processing circuit 30 applies predetermined processings such as sub-sampling, emphasis, frequency modulation and the like to an image signal supplied from, for example, an imaging device, and outputs the result. The recording processing circuit 30 outputs only a luminance frequency-modulated signal when a color/monochrome control signal indicates "monochrome", and outputs, when this signal indicates "color", a frequency-multiplexed signal of a luminance frequency-modulated signal and a color-difference frequency-modulated signal. However, the recording processing circuit 30 may be arranged to discriminate the kind of input image signal without the use of the color/monochrome control signal and, on the basis of the discrimination result, selectively output only the luminance frequency-modulated signal and the frequency-multiplexed signal of the luminance frequency-modulated signal and the color-difference frequency-modulated signal.

A clock generating circuit 32 generates a clock pulse of frequency 2.5 MHz, and a frequency dividing circuit 34 divides the frequency of the clock pulse by two. A band-pass filter (BPF) 36 eliminates the high-frequency component of the clock pulse output from the clock generating circuit 32 and outputs the result. More specifically, the output of the BPF 36 is a sine-wave signal of frequency 2.5 MHz, and the output of a BPF 38 is a sine-wave signal of frequency 1.25 MHz. A switch 40 operates in accordance with a color/monochrome discriminating signal 30b output from the recording processing circuit 30, and is switched to a contact "a" for color and to a contact "b" for monochrome. The sine-wave signal which is selected by the operation of the switch 40 as described above is supplied to an adder 42, where it is frequency-multiplexed with a frequency-modulated signal 30a output from the recording processing circuit 30.

The output of the adder 42 is amplified by a recording amplifier 44 and is magnetically recorded on a video floppy disk 48 by a recording head 46.

As described above, if the image signal to be recorded on the video floppy disk is a monochrome signal, the sine-wave signal of 1.25 MHz is frequency-multiplexed with that signal, whereby the sine-wave signal is multiplexed with a band greatly remote from the luminance frequency-modulated signal band. Accordingly, the leakage of the sine-wave signal is reduced to a great extent.

A signal, reproduced from the video floppy disk 48 by a reproducing head 50, is amplified by a reproducing amplifier 52 and is supplied to a reproduction processing circuit 54 and BPF's 56 and 58. The reproduction processing circuit 54 frequency-demodulates the signal output from the reproducing amplifier 52, and applies predetermined reproducing processings such as de-emphasis, inverse gamma correction and the like. The respective BPF's 56 and 58 have the center frequencies 2.5 MHz and 1.25 MHz and extract the signals of the individual center frequencies from the output of the reproducing amplifier 52. More specifically, if the image signal recorded on the video floppy disk 48 is a color image signal, the BPF 56 outputs a sine-wave signal having a predetermined level, while, in the case of a monochrome image signal, the BPF 58 outputs a sine-wave signal having a predetermined level. A discrimination circuit 60 compares the levels of the sine-wave signals output from the respective BPF's 56 and 58 and discriminates whether the sine-wave signal frequency-multiplexed with the reproduced signal has the frequency 2.5 MHz or 1.25 MHz. The discrimination circuit 60 controls a switch 62 in accordance with the discrimination result. More specifically, if it is determined that the sine-wave signal frequency-multiplexed with the reproduced signal has the frequency 2.5 MHz, the switch 62 is switched to a contact "a", while, in the case of 1.25 MHz, the switch 62 is switched to a contact "b".

The sine-wave signal selected by the switch 62 is supplied to a reference clock generating circuit 64. The reference clock generating circuit 64 amplifies the sine-wave signal output from the switch 62 to a predetermined level, then generates a clock signal, the phase of which is synchronized with that of the sine-wave signal, by means of a PLL circuit (not shown) incorporated in the reference clock generating circuit 64, and then outputs the thus-generated clock signal to a time-base correcting circuit 66. The time-base correcting circuit 66 corrects the signal output from the reproduction processing circuit 54 in accordance with a reference clock 65 output from the reference clock generating circuit 64. The time-base correcting circuit 66 is made up of elements such as a variable delay line and a digital memory, and corrects time-base variations occurring in the reproduced signal by storing the reproduced signal in synchronization with the reference clock and by effecting reading in synchronization with an accurate clock signal.

In the preferred embodiment, for recording and reproduction of a monochrome image signal, the reference signal for time-base correction is recorded by frequency-multiplexing in such a manner that the frequency of the reference signal is made greatly remote from the luminance frequency-modulated signal band. Accordingly, it is possible to record and reproduce a high-quality image without any deterioration in resolution caused by the frequency multiplexing of the reference signal.

As is readily understood from the foregoing, according to the present invention, it is possible to record and reproduce a high-quality image by correcting time-base variations occurring during recording or reproduction without deteriorating the image signal.

What is claimed is:

1. An image signal recording method for recording a color signal or a monochrome image signal on a recording medium, comprising:
   (A) a first step of selectively outputting a color image signal or a monochrome signal;
   (B) a second step of multiplexing a first pilot signal with said color image signal outputted in said first step, or a second pilot signal different from said first pilot signal with said monochrome image signal outputted in said first step and outputting the multiplexed signal; and
   (C) a third step of recording, on said recording medium, either one of said color image signal multiplexed with said first pilot signal in said second step or said monochrome image signal multiplexed with said second pilot signal in said second step.

2. An image signal recording method according to claim 1, wherein, in said second step, said first pilot signal is frequency-multiplexed with said color image signal outputted in said first step, and said second pilot signal different from said first pilot signal is frequency-multiplexed with said monochrome image signal outputted in said first step, and the frequency-multiplexed signal is outputted.

3. An image signal recording method according to claim 2, wherein said second pilot signal is a signal having a single frequency lower than the frequency of said first pilot signal.

4. An image signal recording method according to claim 2, wherein said second pilot signal is a signal having a frequency obtained by dividing the frequency of said first pilot signal.

5. A image signal recording apparatus for recording a color image signal or a monochrome image signal on a recording medium, comprising:
   (A) image signal outputting means for selectively outputting a color image signal or a monochrome image signal;
   (B) pilot signal multiplexing means for receiving either one of said color image signal or said monochrome image signal outputted from said image signal outputting means and for multiplexing a first pilot signal with said color image signal when said color image signal is received or multiplexing a second pilot signal different from said first pilot signal with said monochrome image signal when said monochrome image signal is received and outputting the multiplexed signal; and
   (C) recording means for receiving either one of the color image signal multiplexed with said first pilot signal by said pilot signal multiplexing means or said monochrome image signal multiplexed with said second pilot signal by said pilot signal multiplexing means and recording the received signal on said recording medium.

6. An image signal recording apparatus according to claim 5, wherein said pilot signal multiplexing means is arranged to frequency-multiplex said first pilot signal with said color image signal when said color image signal outputted from said image signal outputting means is received or to frequency-multiplex said second pilot signal with said monochrome image signal when said monochrome image signal outputted from said image signal outputting means is received.

7. An image signal recording apparatus according to claim 6, wherein said second pilot signal is a signal having a single frequency lower than the frequency of said first pilot signal.

8. An image signal recording apparatus according to claim 6, wherein said second pilot signal is a signal having a frequency obtained by dividing the frequency of said first pilot signal.

9. An image signal recording and reproducing system for recording a color image signal or a monochrome signal on a recording medium or reproducing a color image signal or a monochrome image signal from a recording medium on which said signal is recorded, comprising:
   (A) a recording apparatus including:
      (a) image signal outputting means for selectively outputting a color image signal or a monochrome image signal;
      (b) pilot signal multiplexing means for receiving either one of said color image signal or said monochrome image signal outputted from said image signal outputting means and for multiplexing a first pilot signal with said color image signal when said color image signal is received or multiplexing a second pilot signal different from said first pilot signal with said monochrome image signal when said monochrome image signal is received and outputting the multiplexed signal; and
      (c) recording means for receiving either one of the color image signal multiplexed with said first pilot signal by said pilot signal multiplexing means or said monochrome image signal multiplexed with said second pilot signal by said pilot signal multiplexing means and recording the received signal on said recording medium; and
   (B) a reproducing apparatus including:
      (a) reproducing means for reproducing a signal recorded on said recording medium and outputting the reproduced signal;
      (b) discrimination means arranged to detect the pilot signal multiplexed with said signal outputted from said reproducing means and discriminate whether said detected pilot signal is said first pilot signal or said second pilot signal; and (c) time-base variation correcting means arranged to separate said pilot signal multiplexed with said signal outputted from said reproducing means in accordance with the result of discrimination made by said discrimination means, and correct the time-base variation of said signal reproduced by said reproducing means, by using said separated signal.

10. An image signal recording and reproducing system according to claim 9, wherein said pilot signal multiplexing means is arranged to frequency-multiplex said first pilot signal with said color image signal when said color image signal outputted from said image signal outputting means is received or to frequency-multiplex said second pilot signal with said monochrome image signal when said monochrome image signal outputted from said image signal outputting means is received and to output the frequency-multiplexed signal.

11. An image signal recording and reproducing system according to claim 10, wherein said second pilot signal is a signal having a single frequency lower than the frequency of said first pilot signal.

12. An image signal recording and reproducing system according to claim 11, wherein said discrimination means includes:

(A) first extraction means for extracting a signal occupying the frequency band of said first pilot signal from said signal reproduced by said reproducing means;

(B) second extraction means for extracting a signal occupying the frequency band of said second pilot signal from said signal reproduced by said reproducing means; and (C) level comparing means arranged to compare the level of said signal extracted by said first extraction means with the level of said signal extracted by said second extraction means and to discriminate whether the pilot signal multiplexed with said signal reproduced by said reproducing means is said first pilot signal or said second pilot signal.

13. An image signal recording and reproducing system according to claim 12, wherein, if said level comparing means determines that the pilot signal multiplexed with said signal reproduced by said reproducing means is said first pilot signal, said time-base variation correcting means corrects the time-base variation of said signal reproduced by said reproducing means, by using said first pilot signal extracted by said first extraction means, while, if said level comparing means determines that the pilot signal multiplexed with said signal reproduced by said reproducing means is said second pilot signal, said time-base variation correcting means corrects the time-base variation of said signal reproduced by said reproducing means, by using said second pilot signal extracted by said second extraction means.

14. An image signal recording and reproducing system according to claim 10, wherein said second pilot signal is a signal having a frequency obtained by dividing the frequency of said first pilot signal.

15. An image signal recording medium on which either one of a color image signal or a monochrome image signal is recorded, wherein the color image signal is recorded on said image signal recording medium in the state where a first pilot signal is multiplexed with said color image signal, while the monochrome image signal is recorded on said image signal recording medium in the state where a second pilot signal is multiplexed with said monochrome image signal.

16. An image signal recording medium according to claim 15, wherein said second pilot signal is a signal having a single frequency lower than the frequency of said first pilot signal.

17. An image signal recording medium according to claim 16, wherein said second pilot signal is a signal having a frequency obtained by dividing the frequency of said first pilot signal.

18. An image signal recording medium according to claim 16, wherein said color image signal recorded on said image signal recording medium is frequency-multiplexed with said first pilot signal, while said monochrome image signal is frequency-multiplexed with said second pilot signal different from said first pilot signal.

* * * * *